Patented Oct. 11, 1949

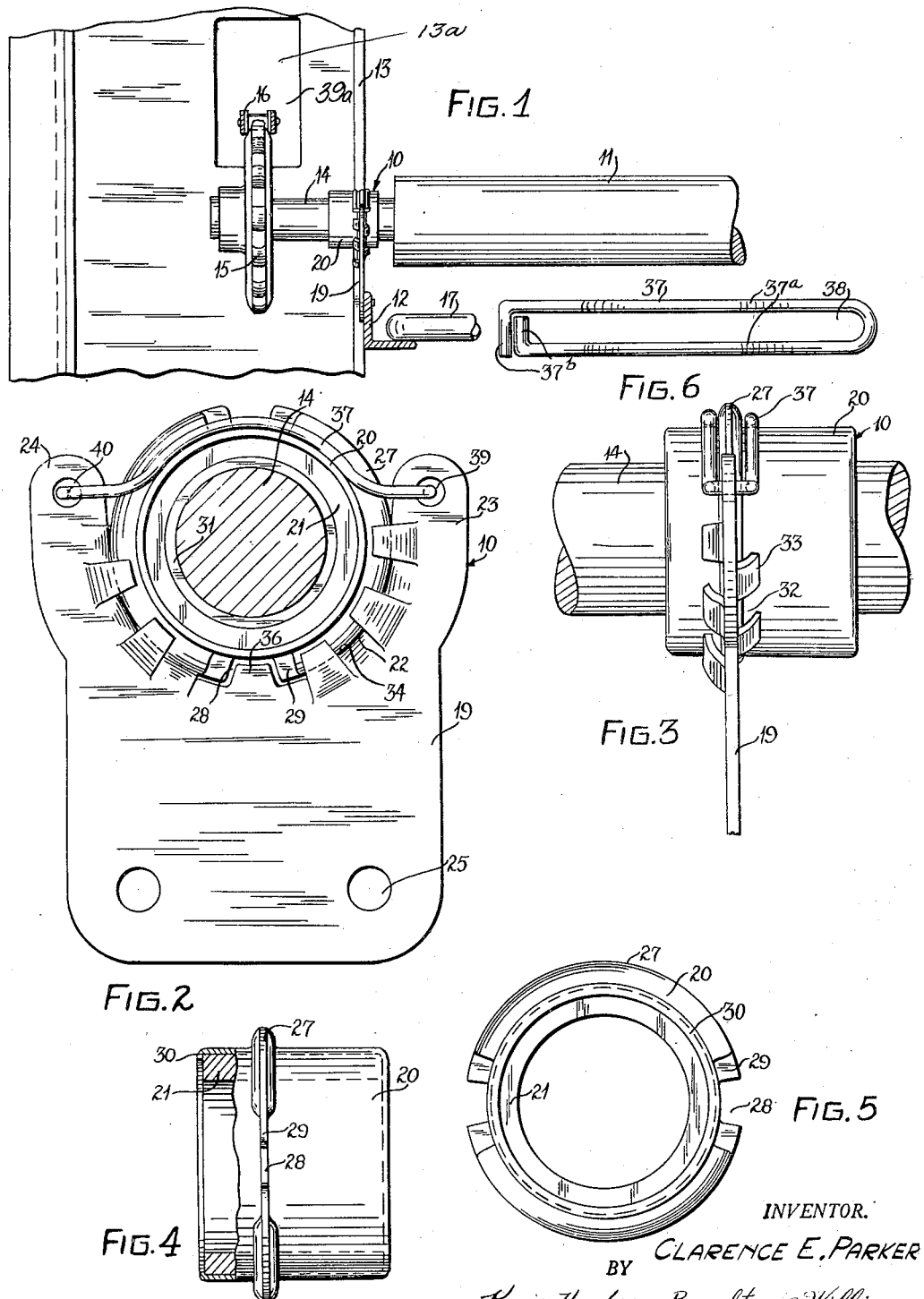

2,484,725

UNITED STATES PATENT OFFICE 2,484,725

SHAFT BEARING

Clarence E. Parker, Painesville, Ohio, assignor to The Coe Manufacturing Company, Painesville, Ohio, a corporation of Ohio Application January 29, 1945, Serial No. 575,053

7 Claims. (Cl. 308—22)

This invention relates to shaft bearings and, as one of its objects, aims to provide a novel construction which will permit self-alignment of bearings of this kind and will enable the bearings to be economically manufactured and installed.

Another object of this invention is to provide a strong and durable shaft bearing of a novel construction requiring a minimum amount of material and labor in its manufacture and which can be readily adjusted to compensate for wear without dismounting the bearing or the shaft supported thereby.

A further object of the present invention is to provide a novel shaft bearing of the character mentioned, which will render satisfactory service with minimum attention or servicing and which will be well suited for use in driers or other locations where relatively high operating temperatures exist.

The invention can be further briefly summarized as consisting in certain novel combinations and arrangements of parts hereinafter described and particularly set out in the appended claims.

In the accompanying sheet of drawings,

Fig. 1 is an elevational view showing one use to which the bearing of the present invention may be applied.

Fig. 2 is an end view of the bearing with the shaft supported thereby shown in section.

Fig. 3 is a side elevation of the bearing and shaft.

Fig. 4 is a side elevation of the case removed from the bracket and with portions of the case broken away to show the bushing therein.

Fig. 5 is a detached end view of the case, and

Fig. 6 is a plan view of the retaining member showing the same detached from the bracket.

The shaft bearing 10 of the present invention can be used for various purposes, one of which is illustrated by way of example in Fig. 1 of the drawings, wherein this bearing is employed in an apparatus for drying wall board or the like and rotatably supports one end of a roll 11. The bearing is mounted on a longitudinal side member 12 of the frame 13 of the drier and the roll has a shaft or neck 14 extending through the bearing. The shaft 14 carries a sprocket 15 by which the roll is driven and which cooperates with a drive chain 16 extending through the frame opening 13a. The frame member 12 also supports a heating pipe or coil 17 which is located beneath the roll 11.

As shown in Figs. 2 and 3, the bearing 10 comprises a bracket 19 and a case 20 supported by the bracket and containing an annular bearing element 21 which rotatably supports the shaft 14. The bracket 19 is preferably in the form of a generally flat sheet metal plate, although t may consist of a plurality of connected parts, having a recess 22 in the upper end thereof in which the case 20 is received and a pair of spaced arms 23 and 24 on opposite sides of such recess. The bracket 19 is provided with openings 25 adjacent its lower end by which the bearing can be bolted or otherwise secured to a suitable support such as the frame member 12.

The case 20 is in the form of a tubular sheet metal housing or shell having an external annular rib 27 intermediate its ends which serves to reinforce the case, and also cooperates with the bracket 19 in a novel manner for supporting the case therein as will be explained hereinafter. The shell of the case 20 can be made either from a single piece of tubular stock by forming or spinning the external rib 27 thereon, or may comprise a pair of substantially coaxially aligned hollow members having external flanges at their inner ends and which flanges have portions thereof in face-to-face or abutting engagement with each other and connected together as by spot welding.

At spaced points around the case 20, in this instance two substantially diametrically opposed points, the rib 27 is cut out or recessed to provide the notches 28 to which further reference will presently be made. The portions of the rib 27 which are located on opposite sides of the notches 28 and immediately adjacent thereto are flat and are connected together in face-to-face engagement by being spot welded together at these points so as to form solid shoulders 29.

As mentioned above, the case 20 is provided internally thereof with an annular bearing element 21 which rotatably supports the shaft 14. In this instance the bearing element 21 is in the form of a bushing and may be a so-called oilless bushing of the type which embodies its own supply of lubricant. The bearing element 21 is retained in the case 20 as by means of the inturned annular beads 30 which are provided on the outer ends of the case and engage the outer ends of the bearing element. The shaft 14 can be rotatably supported directly in the bearing element 21 or may have a bushing 31 thereon which forms an inner race in the bearing element 21. The case 20 also supports and strengthens the element 21 which contributes to a longer life for the latter particularly when the bearing is being used in high temperature surroundings.

Reverting to the bracket 19, it will be readily seen from Figs. 2 and 3 that the portion of the bracket adjacent the arcuate recess 22 is of a construction to provide the bracket with an arcuate groove 32 in which the external ridge 27 of the case 20 engages when the latter is placed in the recess. This groove may be provided on the bracket in various ways, such as by the partially sheared, substantially radially extending integral lugs 33 whose inner ends extend into the recess 22 in overhanging relation to the portion or edge 34 of the bracket which defines the arcuate bottom wall of the recess. As shown in Fig. 3, the lugs 33 are deflected alternately in opposite directions out of the general plane of the bracket 19 so that they cooperate with the arcuate portion or edge 34 in defining the arcuate groove 32. When the case 20 is inserted into the recess 22 of the bracket, the lower half of the external ridge 27 engages in the arcuate groove 32 with one group of the lugs 33 lying against or adjacent one side of the ridge and the other group of lugs lying on the opposite side of the ridge. The groove 32 and the ridge 27 are of such size and shape as to provide some play or looseness, which will permit the case 20 to have limited shifting relative to the bracket for self-aligning purposes.

At the bottom of the recess 22 the bracket 19 is provided with a substantially flat lug or projection 36 lying substantially in the plane of the bracket and which is of a size to engage in one of the notches 28 of the external ridge 27 of the case 20. The lug 36 extends between and cooperates with the spaced shoulders 29 of the lower notch 28 for holding the case 20 against rotation or arcuate shifting in the recess 22.

For retaining the case 20 in the recess 22 of the bracket 19 in the relation above described, the bracket is provided with a retaining member 37 which spans the recess and extends over the case. In this instance the retaining member 37 is in the form of a strap or clip formed of resilient wire and having spaced portions or sides 37a with a slot 38 therebetween. One end of the member 37 is connected with the bracket as by having a loop or bight portion pivoted in an opening 39 of the arm 23. The other end of the member 37 releasably engages in an opening 40 of the arm 24. The releasable end of the member 37 has angular portions or tip elements 37b which can be spread apart by springing of the sides 37a so as to permit insertion into or removal from the opening 40. As shown in Fig. 2 the member 37 is preferably bowed so as to lie against and conform to the outer curvature of the case 20 with the ridge 27 projecting through the slot 38.

One of the advantages of the bearing 10 is that adjustment can be quickly and easily made to compensate for wear which will occur in the bearing element 21 after prolonged service. This adjustment can be made without removing the bearing from the frame member 12 and without dismounting the drier roll 11 or removing the sprocket 15 therefrom. The adjustment is made by disengaging the end of the retaining member 37 from the arm 24 and then lifting the end of the roll 11 a small distance sufficient to disengage the lower notch 28 of the case 20 from the lug 36 of the bracket. The case is then rotated on the shaft 14 through a distance of 180°, or some other angular distance depending upon the number of notches provided, and the roll is lowered to re-engage the lug 36 in the notch 28. The rotation of the case in the recess of the bracket brings an unworn portion of the bearing element to a load supporting position beneath the shaft 14. After this adjustment has been made, as just described, the retaining member 37 is swung back to its retaining position in engagement with the case and its end is re-engaged in the opening 40 of the arm 24. When the bearing element has become wholly worn, the case can be easily removed and replaced by reason of the above described construction for the supporting bracket. In the case of bearings being used where high temperatures prevail the bearings wear out rapidly and it is an important advantage for the present invention that the bracket need not be dismounted and thrown away since it is only necessary to install a new case.

From the foregoing description and the accompanying drawing, it will now be readily understood that the present invention provides a novel form of bearing which is of a very simple and economic construction and which can be used to advantage in various places, including driers and other apparatus in which relatively high operating temperatures exist. It will also be seen that the bearing can be readily adjusted to compensate for wear without dismounting the shaft supported thereby or disconnecting the shaft from its driving means. It will also be seen that the construction of the bearing lends itself very readily to the use of sheet metal for economically manufacturing certain of its parts.

While I have illustrated and described the improved shaft bearing in considerable detail, it will be understood, of course, that I do not wish to be correspondingnly limited but regard my invention as including all changes and modifications coming within the scope of the appended claims.

Having thus described my invention, what I claim is:

1. A shaft bearing comprising, a bracket having a recess therein with portions of the bracket defining an arcuate groove in the edge of said recess, a case received in said recess, said case having an annular bearing element internally thereof for supporting a movable shaft and an external rib engaging in said groove, said bracket and rib having cooperating shoulder portions which hold said case against rotation while the rib is seated in said groove but are adapted to be disengaged to permit arcuate adjustment of the case in said recess, and means releasably connected with the bracket and spanning said recess for retaining said case therein, said releasably connected means having an arcuate portion engageable with said case and a slot in said arcuate portion into which said external rib extends.

2. A shaft bearing comprising, a bracket having a recess therein with portions of the bracket defining an arcuate groove in the edge of said recess, a case received in said recess, said case having an annular bearing element internally thereof for supporting a movable shaft and an external rib engaging in said groove, said bracket having a projection therein extending into said groove at the bottom of said recess and said rib having spaced notches therein selectively engageable with said projection for holding said case against rotation, and holding means releasably connected with said bracket and spanning said recess for retaining said case therein, said case being liftable in said recess upon release of said holding means for adjusting the case arcuately to bring another of said notches into register with said projection.

3. A bearing comprising, a substantially flat sheet metal plate having an arcuate recess extending into an edge thereof, means on the plate projecting beyond the edge of said recess so as to define an arcuate groove, a case received in said recess, said case having an annular bearing element internally thereof for supporting a movable shaft and an external arcuate rib engaging in said groove, interengaging shoulder means on said plate and rib for holding the case against rotation in the recess but being releasable to permit arcuate adjustment of the case in said recess, and means connected with said plate and spanning said recess for retaining said case in the latter with said shoulder means in engagement with each other, said connected means having an arcuate portion engageable with said case and a slot lying substantially in the plane of said plate and into which said rib extends.

4. A bearing comprising, a sheet metal plate having an arcuate recess extending thereinto from an edge thereof and lugs offset out of the plane of the plate and extending beyond the edge of the recess, said lugs cooperating with the edge of the plate around the recess to define a groove, a case received in said recess, said case having an annular bearing element internally thereof for supporting a movable shaft and an external rib engaging in said groove, interfitting elements on said plate and case for holding the case against rotation in said recess, and means on said plate and cooperating with said case for retaining the latter in said recess with said interfitting elements in engagement with each other.

5. A bearing comprising, a sheet metal plate having spaced arms and an arcuate recess therebetween, the portion of the plate defining the arcuate edge of said recess having lugs thereon with alternate lugs offset in opposite directions out of the plane of the plate, said lugs extending beyond the edge of said recess and cooperating with edge portions of the plate to define an arcuate groove, a case received in said recess and comprising a sheet metal shell having an external annular rib thereon intermediate its ends and adapted to engage in said groove, an annular bearing element retained in said case and adapted to support a rotatable shaft, cooperating shoulder elements on said plate and rib for holding the case against rotation in said recess, and a retaining member for retaining said case in said recess, said retaining member having pivotal connection with one of said arms and releasable engagement with the other arm.

6. A shaft bearing comprising, a bracket in the form of a generally flat sheet metal plate having a pair of spaced arms and a substantially semi-circular recess therebetween, sheet metal elements connected with the portion of the plate which defines the edge of said recess and said elements lying immediately adjacent but on opposite sides of the plane of said plate, said elements extending substantially radially of said recess and projecting beyond the edge thereof so as to cooperate with said plate portion in defining an arcuate groove, a case received in said recess and having bearing means therein for supporting a movable shaft and an external rib engaging in said groove, said bracket and rib having cooperating lug and slot elements for holding said case against rotation while the rib is engaged in said groove but adapted to be disengaged to permit arcuate adjustment of the case in said recess, and a retaining member connected with the arms of said bracket and spanning said recess for retaining said case therein.

7. A shaft bearing as defined in claim 6 in which the arms of the bracket have openings therein and the retaining member is a wire clip having a bight portion at one end thereof pivotally engaging in the opening of one of said arms and at the other end having cooperating angular tip elements engaging in the opening of the other arm, said tip elements being separable by springing of the wire clip for disengaging said other end from said other arm.

CLARENCE E. PARKER.

REFERENCES CITED

The following references are of record in the file of this patent:

UNITED STATES PATENTS

| Number | Name | Date |
| --- | --- | --- |
| 476,158 | Morton | May 31, 1892 |
| 1,562,130 | Stitzinger | Nov. 17, 1925 |
| 1,606,747 | Carter | Nov. 16, 1926 |
| 1,694,438 | Chinn | Dec. 11, 1928 |
| 1,743,548 | Howes | Jan. 14, 1930 |
| 2,114,051 | Freed | Apr. 12, 1938 |
| 2,143,201 | Martinet et al. | Jan. 10, 1939 |

FOREIGN PATENTS

| Number | Country | Date |
| --- | --- | --- |
| 422,974 | Great Britain | 1935 |